United States Patent [19]

Williams et al.

[11] 4,229,748

[45] Oct. 21, 1980

[54] JET DROP PRINTER

[75] Inventors: Ted F. Williams, Union; Charles L. Cha, Xenia, both of Ohio

[73] Assignee: The Mead Corporation, Dayton, Ohio

[21] Appl. No.: 12,590

[22] Filed: Feb. 16, 1979

[51] Int. Cl.[3] .............................................. G01D 15/18

[52] U.S. Cl. ........................................................ 346/75

[58] Field of Search ................................. 346/75, 140 R

[56] References Cited

U.S. PATENT DOCUMENTS

| | | | |
|---|---|---|---|
| Re. 28,219 | 10/1974 | Taylor | 346/75 |
| 3,373,437 | 3/1968 | Sweet | 346/75 |
| 3,739,393 | 6/1973 | Lyon | 346/75 X |
| 3,805,273 | 4/1974 | Brady | 346/75 |
| 3,882,508 | 5/1975 | Stoneburner | 346/75 |
| 4,010,477 | 3/1977 | Frey | 346/75 |

*Primary Examiner*—Joseph W. Hartary

*Attorney, Agent, or Firm*—Biebel, French & Nauman

[57] ABSTRACT

A jet drop printer for depositing drops of print fluid on a moving print medium includes an elongated fluid reservoir with an orifice plate extending the length of the fluid reservoir and communicating therewith. The orifice plate defines a plurality of orifices from which filaments of print fluid emerge. The orifices are positioned along an orifice line on the orifice plate which is non-parallel with respect to the center line of the orifice plate, which center line extends in the direction of elongation of the reservoir. A stimulator induces bending waves in the orifice plate which travel along the orifice plate in a direction parallel to the center line. Substantially uniform break up of the filaments into drop streams occurs as the bending waves impart substantially the same amplitude of mechanical stimulation to each of the fluid filaments. The drops in the drop streams are selectively charged and deflected such that selected ones of the drops are directed to strike the print medium and others of the drops are directed to a catcher.

15 Claims, 8 Drawing Figures

JET DROP PRINTER

BACKGROUND OF THE INVENTION

The present invention relates generally to the field of jet drop printing and more particularly to jet drop printers of the type shown in Sweet et al, U.S. Pat. No. 3,373,437 and in Taylor et al, U.S. Pat. No. Re.28,219. In printers of this type there are one or more rows of orifices defined by an orifice plate which receive an electrically conductive recording fluid, such as for instance a water base ink, from a pressurized fluid reservoir. A fluid filament emerges from each orifice and breaks up into a drop stream.

These recorders accomplish graphic reproduction by selectively charging and deflecting the drops in each of the streams and thereafter depositing at least some of the drops on a moving web of paper or other material. The drops which are not deposited on the moving web are caught by an appropriately positioned catcher. Drop charging, deflection, and catching are all accomplished as described in the abovementioned Sweet et al and Taylor et al patents, or in Brady et al, U.S. Pat. No. 3,805,273.

One of the most difficult problems encountered in the operation of jet drop printers of the above mentioned type is that of drop stimulation. For high quality printing it is necessary that all jets be stimulated at a frequency approximating the jet natural resonance frequency. This will cause the jets to break up into streams of uniformly sized and regularly spaced drops. Furthermore it is necessary that drop generation not be accompanied by generation of satellite drops and that the break up of the streams into drops occur at a predetermined location in proximity to a charging electrode. The general concept of stimulating a jet stream to break up into drops is well known in the art and is discussed in detail in the above mentioned prior art patents.

Early attempts at stimulating array type jet drop printers, that is printers having a plurality of jet drop streams, produced unsatisfactory results due to the generation of unpredictable vibrational modes within the printing head. This problem is described in some detail in Lyon et al, U.S. Pat. No. 3,739,393, which mentions a "cusping" pattern phenomenon that is characteristic of unsatisfactory stimulation. The cusps which comprise such a pattern are observed by looking at a row of stimulated jets and noting the locations at which the jet filaments break up into streams of drops. In accordance with the Lyon et al invention, the jets are stimulated by a traveling wave technique wherein a continuous series of bending waves are caused to propagate along the orifice plate, with the waves being absorbed at the ends of the plate to prevent undesirable reflections. Each bending wave transits once past each orifice and in so doing imparts a drop stimulating disturbance to the jet associated therewith. In general these waves must be generated at a frequency near the natural frequency of the jets, and each wave, as viewed widthwise across the orifice plate, should constitute a half wave at the first order bending mode. If such waves are generated and propagated as taught by Lyon et al, then cusping patterns are eliminated, and high quality stimulation is achieved.

One problem that exists with traveling wave stimulation as taught by Lyon et al is that the bending waves are attenuated as they travel along the length of the orifice plate. This in turn causes a progressive lengthening of the jet filaments, so that filaments at the far end of the orifice plate may be considerably longer than those which are near the source of bending wave origin. This makes it difficult to locate properly the charging electrodes which, for proper operation, should be located adjacent the ends of the fluid filaments.

It is known that there is a critical filament length range, and that when the mean length of any filament falls outside this range, then the jet begins generating large numbers of satellite drops. Thus, for a given attenuation coefficient, which is determined primarily by boundary conditions around the orifice plate material, the row of jets in a jet drop printer stimulated as taught by the Lyon et al patent, may not be longer than a predetermined maximum length for successful stimulation. In an excessively long printer, the filaments at the end of the orifice plate furthest from the stimulator tend to be longer than the critical maximum and can be shortened sufficiently only be application of fairly high amplitude stimulation. If this is done, all of the filaments along the plate are shortened, so that the filaments nearest the transducer may become shorter than the critical minimum filament length.

One approach to solution of the attenuation problem encountered with traveling wave stimulation of the orifice plate is shown in Stoneburner, U.S. Pat. No. 3,882,508. Stoneburner suggests using an orifice plate having an effectively tapered width, with the plate becoming narrower toward the end furthest from the stimulation transducer. This tapering counteracts the natural tendency toward attenuation of the bending waves which travel down the length of the orifice plate. As a result of the reduction in bending wave attenuation, more uniform filament lengths are achieved and satellite drop generation is greatly reduced. The length of the orifice plate is limited, however, by acceptable maximum and minimum orifice plate widths. Additionally, some difficulty may be encountered in manufacturing such a tapered orifice plate.

Accordingly, it is seen that there is a need for a traveling wave stimulation technique in which the effect of attenuation of the waves moving along the orifice plate is substantially reduced, and in which relatively high amplitude stimulation may be applied to the orifice plate without shortening the filaments adjacent the stimulation point to a length less than the critical minimum filament length.

SUMMARY OF THE INVENTION

An ink jet printer for depositing a plurality of drops of print fluid on a moving print medium includes a fluid reservoir means defining an elongated fluid receiving reservoir for receiving a print fluid. An orifice plate means extends the length of the fluid receiving reservoir and communicates therewith. The orifice plate means defines a plurality of orifices from which filaments of print fluid emerge. The orifices are positioned along an orifice line on the orifice plate means which is non-parallel with respect to the center line of the orifice plate which center line extends in the direction of elongation of said fluid receiving reservoir. A stimulator means induces bending waves in the orifice plate means, which waves travel along the orifice plate means in a direction parallel to the center line and cause substantially uniform break up of the filaments into drop streams. Means are provided for selectively charging the drops in the drop streams. A catcher means is positioned adjacent the drop streams for catching drops in the drop streams. A means is provided for deflecting charged drops in the drop streams such that selected ones of drops are directed to the print medium and others of the drops are directed to the catcher means, to be caught thereby.

The stimulator means may stimulate the orifice plate means at a point substantially on the center line and adjacent to a first end of the orifice plate means. The orifice line may be substantially straight and converge with the center line from a point adjacent to the first end of the orifice plate means, which point is substantially laterally displaced from the center line. The included angle $\theta$ between the center line and the orifice line may be defined by the equation:

$$\theta = \tan^{-1}\left[\frac{W\cos^{-1}(e^{-\alpha b})}{\pi b}\right]$$

where $\alpha$ equals the total attenuation coefficient of the orifice plate means, b equals the distance along the center line from the point of stimulation to the intersection of the orifice line and the center line, and W equals the width of the orifice plate means.

Alternatively, the orifice line may be a curved line defined by the equation: $\cos\beta(y)=e^{\alpha(x-b)}$, where $\alpha$ equals the total attenuation coefficient of the orifice plate means, and x equals the distance in a direction parallel to the center line from the point of stimulation on the center line. y equals the distance from the center line in a direction perpendicular to the center line, divided by one-half of the width of the orifice plate means. $\beta(y)$ equals $(y\pi/W)$, and W equals the width of the orifice plate means.

Accordingly, it is an object of the present invention to provide stimulation apparatus for an ink jet printer in which a plurality of orifices are positioned along an orifice plate, with the orifices closest to the point at which the plate is stimulated being offset from the center line of the orifice plate, whereby the amplitude of stimulation applied to the plate may be increased substantially without shortening the fluid filaments emerging from the orifices closest to the stimulation point to less than a critical minimum length; to provide such stimulation apparatus in which the orifices are positioned along a line which converges toward the center line of the orifice plate at the end of the plate furthest from the point of stimulation; and to provide such stimulation apparatus having either a curved orifice line or, alternatively, a straight orifice line.

DETAILED DESCRIPTION OF THE PREFERRED EMBODIMENTS

Figure 1:
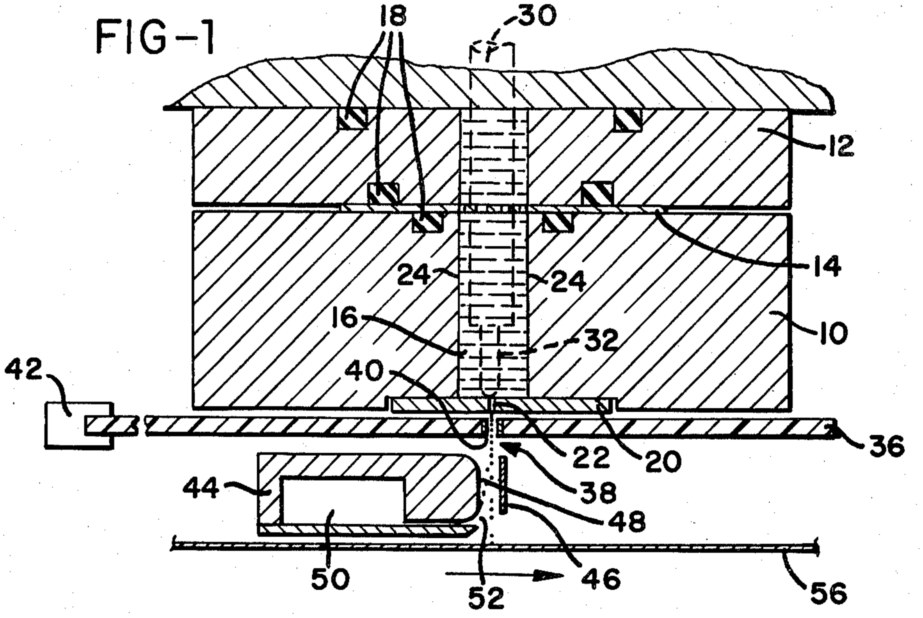
FIG. 1 is a sectional view taken through an ink jet printer embodying the present invention.

Reference is now made to FIG. 1 which is a sectional view taken generally widthwise of an ink jet printer embodying the present invention. A fluid reservoir means includes a manifold 10 and upper manifold plate 12, with a filter plate 14 positioned therebetween. The fluid reservoir means defines an elongated fluid receiving reservoir 16 which receives a print fluid through a fluid supply opening (not shown). The sectional view of FIG. 1 is taken in a plane perpendicular to the direction of the elongation of the reservoir 16. Gaskets 18 provide a fluid tight seal for the reservoir 16.

Figure 2:
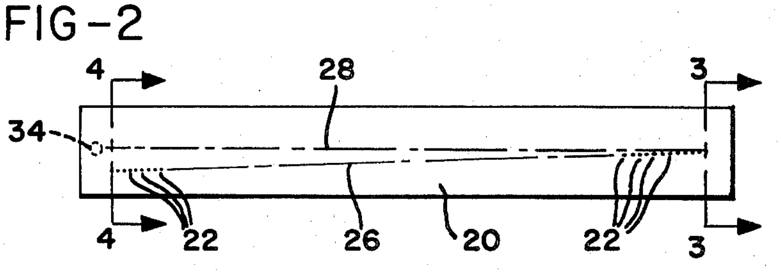
FIG. 2 is a plan view of an orifice plate used in the printer of the present invention.

An orifice plate means including orifice plate 20 is mounted on the bottom of manifold 10 and extends the length of the fluid receiving reservoir 16, communicating therewith. Typically, the orifice plate 20 is adhesively bonded to manifold 10. The orifice plate 20 defines a plurality of orifices 22, only one of which is shown in FIG. 1, from which filaments of print fluid emerge. FIG. 2 is a plan view of the active region of the orifice plate 20, the active region being the area of the orifice plate 20 between the side walls 24 of the reservoir 16. The orifices 22 are positioned along an orifice line 26 on the orifice plate 20 which is non-parallel with respect to the center line 28 of the orifice plate. The center line 28 extends in the direction of elongation of the fluid receiving reservoir 16.

A stimulator means 30 is provided for inducing bending waves in the orifice plate 20 which travel along the orifice plate 20 in a direction parallel to the center line 28. In a printer constructed according to the present invention, the waves impart substantially the same amplitude of mechanical stimulation to each of the fluid filaments along the orifice plate 20, thus causing substantially uniform break up of the fluid filaments into drop streams. The stimulator means 30 may include a piezoelectric transducer stimulator, having a stimulator probe 32 which contacts the orifice plate means 20 at point 34 (FIG. 2).

A means for selectively charging the drops in the drop streams includes a charge plate 36 which defines a plurality of openings 38 therein. Openings 38 are aligned with the orifices 22 in the orifice plate means 20. Each opening 38 is coated with an electrically conductive material, forming a cylindrical charge electrode 40. Electrical conductors plated on the surface of charge plate 36 electrically contact each of the charge electrodes 40. These electrical conductors are, in turn, connected via connector 42 to a charge control circuit which controls application of charging potentials to the electrodes 40. By proper control and timing of charge signals applied to the electrodes 40, the drops which are formed from the ends of the fluid filaments emerging from the orifices 22 may be selectively charged.

A catcher means 44 is positioned adjacent the drop streams for catching drops in the streams. The catcher means extends the length of the printer and a deflection electrode 46 extends parallel thereto, but on the opposite side of the drop streams. By imposing an appropriate voltage differential between the catcher means 44 and the deflection electrode 46, a deflection field, perpendicular to the paths of the drop streams, is created. Charged drops passing through the deflection field are directed to strike the face 48 of the catcher 44. These drops then run down the face of catcher 44 and are ingested into the partially evacuated interior 50 of the catcher through slot 52 adjacent the bottom of the catcher face 48. Uncharged drops, however, are unaffected by the deflection field and pass through the field to strike the moving print medium 56. The fluid drops deposited upon the print medium 56 form collectively the desired print image thereon.

Figure 3:
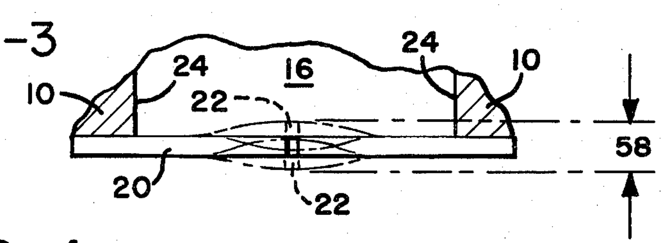
FIGS. 3 and 4 are diagrammatic representations of orifice plate stimulation, taken generally along lines 3—3 and 4—4, respectively, in FIG. 2.
Figure 4:
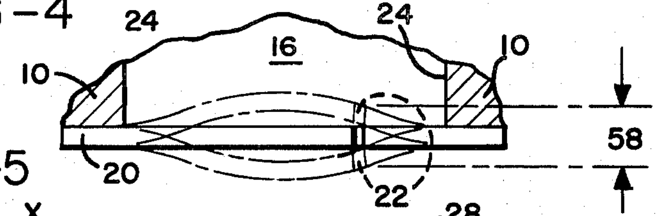

FIGS. 3 and 4 illustrate the manner in which positioning the orifice line with respect to the center line of the orifice plate 20 as shown in FIG. 2 results in substantially uniform stimulation of each of the fluid filaments along the orifice plate 20 and substantial uniform break up of the filaments into drop streams. FIGS. 3 and 4 are diagrammatic sectional views in which section lines have been omitted from the orifice plate 20 for the sake of clarity. As shown in FIG. 4, by positioning the orifices 22 off-center with respect to the orifice plate 20 near the end of the plate to which mechanical stimulation is applied, the stimulation amplitude experienced by these orifices is substantially less than the stimulation amplitude which would be experienced if the orifices were positioned along the center line of the orifice plate 20. Similarly, as seen in FIG. 3, by positioning the orifices 22 close to the center line of the orifice plate 20 at the end of the plate furthest from the stimulator, these orifices receive the maximum stimulation available. Thus the bending wave displacement distance 58 experienced by the orifices along the orifice line 26 will tend to remain substantially uniform.

Figure 5:
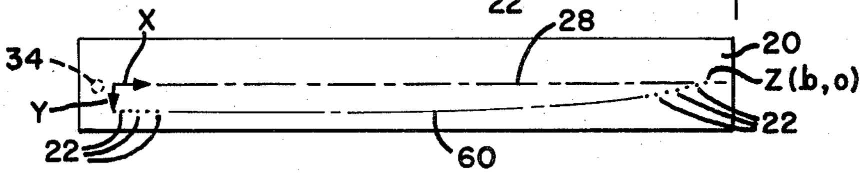
FIG. 5 is a plan view of an alternative orifice plate structure.

Due to the nature of wave propagation and attenuation in an orifice plate, an orifice line positioned on the orifice plate such that each point along the line receives stimulation of precisely the same amplitude is a curved line, as illustrated in FIG. 5. Curved orifice line 60 provides even more uniform stimulation to the orifices positioned therealong than the straight orifice line 26 of FIG. 2.

The nature of bending wave propagation at a given frequency along the plate 20 in FIG. 5 is described by the following equations which ignore phase variation and deal only with peak amplitude.

(1) $A(x,y) = A(x,0)\cos\beta(y)$, where $A(x,y)$ = peak stimulation amplitude at a point,
$A(x,0)$ = peak wave amplitude along the center line,
$y$ = displacement from the center line,
$\beta(y) = \frac{y}{W}\pi$,
$W$ = plate width, and
$x$ = displacement along the center line from the point of stimulation.

(2) Since, $A(x,0) = A_0e^{-\alpha x}$, where $A_0$ = peak stimulation amplitude at (0,0), and
$\alpha$ = total attenuation coefficient, $$A(x,y)=A_0e^{-\alpha x}\cos\beta(y) \quad (3)$$

If all of the orifices are to receive the same amplitude of stimulation, the orifice line coincides with a constant amplitude contour line. To determine the shape of such a contour line, let $$A(x,y)=\text{constant} \quad (4)$$

Letting this constant amplitude equal the amplitude of stimulation at an arbitrary point (b,0) on the center line, $$A(b,o)=A_0e^{-\alpha b}\cos(o)=A_0e^{-\alpha b} \quad (5)$$

Substituting this constant in equation (3), above, $$A_0e^{-\alpha b}=A_0e^{-\alpha x}\cos\beta(y) \quad (4)$$

Therefore $$\cos\beta(y)=e^{\alpha(x-b)} \quad (5)$$

Figure 6:
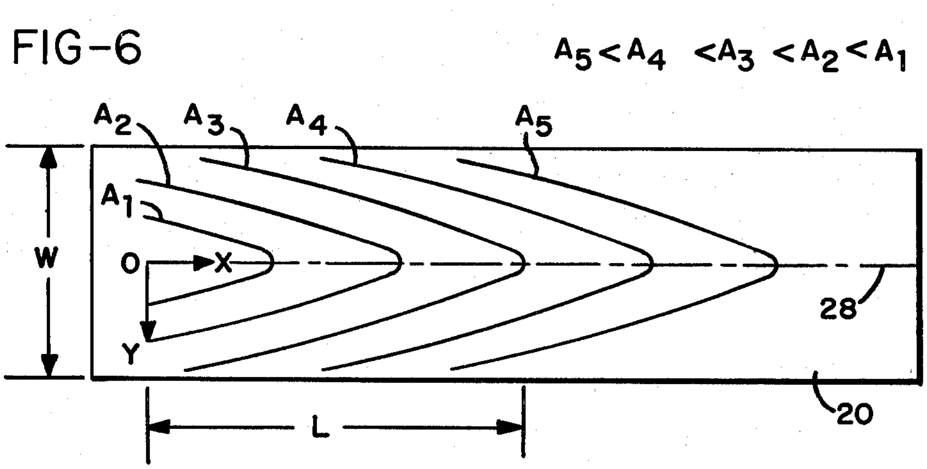
FIGS. 6–8 are schematic plan view representations of orifice plates, useful in explaining the present invention.

For a given attenuation coefficient $\alpha$, equation (5) defines a family of curves, each curve corresponding to a constant amplitude contour line. Such a family of curves is illustrated in FIG. 6. Clearly, the useful contours are those for which $A(x,y)=\text{constant}\geqq A(b_3,0)$, which defines the maximum useful orifice plate length of $L=b_3$. This is true since contours defined by intersection points with $b<b_3$ approach the y-axis too far from the stimulation point for practical positioning of orifices along the contours. The distance L, in turn, is determined by the width of the orifice plate 20, which is generally limited to $$W_{MAX}\lesssim(3\lambda/2) \quad (6)$$

If a wider orifice plate were to be used, undesirable bending modes might be generated in the plate, as discussed in Stoneburner, U.S. Pat. No. 3,882,508.

Figure 7:
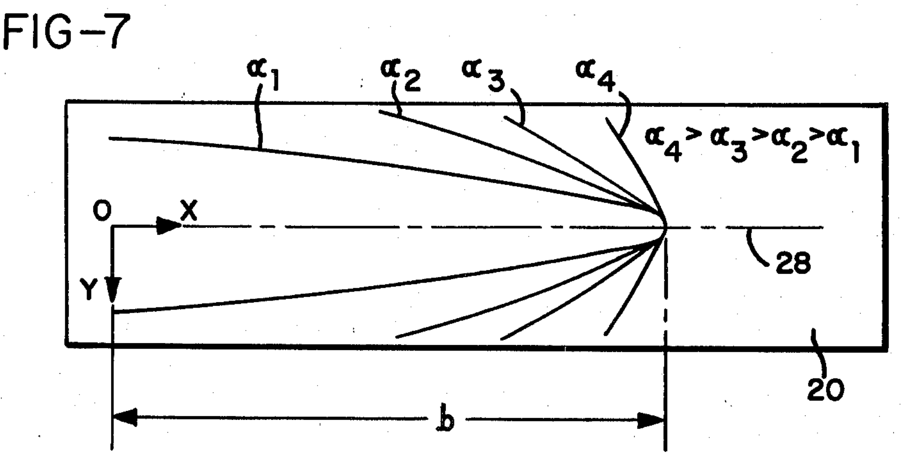

Alternatively, for a given intersection point on the center line of the orifice plate 20, and various attenuation coefficients $\alpha$, a family of curves is defined by equation (6), as shown in FIG. 7. As seen clearly, the greater the attenuation provided by the orifice plate, the more inclined the orifice line must be with respect to the center line 28.

A curved orifice line, however, results in substantial difficulties in properly timing the application of the charging signals to the charge electrodes associated with the jet streams. In such an arrangement, nonuniformly varying charge signal delays must necessarily be provided for the charge electrodes servicing the orifices along the orifice plate 20. Additionally, a curved orifice line results in difficulties in manufacturing the orifice plate and charge plate, in providing proper registration therebetween, and in deflecting and catching charged drops.

Figure 8:
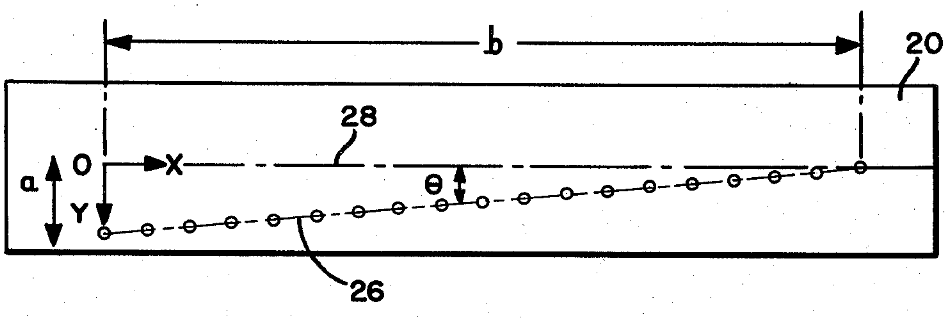

Returning again to the orifice plate configuration in which a straight orifice line is used to approximate a constant amplitude contour line, such an orifice plate is illustrated diagrammatically in FIG. 8. A straight orifice line 26 is selected to approximate such a contour line by letting the stimulation amplitudes experienced by orifices at each end of the line 26 be equal. Thus, $$A(0,a)=A(b,0) \quad (7)$$

Substituting into equation (3), $$A_0e^{-\alpha(0)}\cos(a\pi/W)=A_0e^{-\alpha b}\cos(0) \quad (8)$$

Therefore, $$a=\frac{W}{\pi}\cos^{-1}(e^{\alpha b}). \quad (9)$$

Since, $$\theta=\tan^{-1}(a/b), \quad (10)$$

$$\theta = \tan^{-1}\left[\frac{W\cos^{-1}(e^{-\alpha b})}{\pi b}\right] \quad (11)$$

Both $\alpha$ and b are measurable and, therefore, the angle $\theta$ is defined.

In the above discussion, it will be appreciated that an orifice line corresponding to or approximating a constant amplitude contour line was determined. In practice, however, it may be desirable to utilize an orifice line having an angle $\theta$ with respect to the center line which is less than the angle specified by equation (11), in order to provide a longer line of orifices. In such a case, the orifices along the orifice line will experience a gradual attenuation of stimulation amplitude. As long as the stimulation amplitudes experienced by the orifices result in fluid filaments within the maximum and minimum critical filament lengths discussed above, however, successful printer operation will be obtained.

While the forms of apparatus herein described constitute preferred embodiments of the invention, it is to be understood that the invention is not limited to these precise forms of apparatus, and that changes may be made therein without departing from the scope of the invention.

What is claimed is:

1. An ink jet printer for depositing a plurality of drops of print fluid on a moving print medium, comprising:

fluid reservoir means defining an elongated fluid receiving reservoir for receiving a print fluid, orifice plate means extending the length of said fluid receiving reservoir and communicating therewith, said orifice plate means defining a plurality of orifices from which filaments of said print fluid emerge, said orifices being positioned along an orifice line on said orifice plate means which is non-parallel with respect to the center line of said orifice plate means, all of said orifices along said orifice line being positioned to one side of said center line for decreased point-to-point variation in stimulation amplitude, said center line extending in the direction of elongation of said fluid receiving reservoir, stimulator means for inducing bending waves in said orifice plate means which travel along said orifice plate means in a direction parallel to said center line, said waves imparting mechanical stimulation to each of said fluid filaments to cause break up of said filaments into drop streams, means for selectively charging said drops in said drop streams, catcher means, positioned adjacent said drop streams, for catching drops in said drop streams, and means for deflecting charged drops in said drop streams such that selected ones of said drops are directed to strike said print medium and others of said drops are directed to said catcher means to be caught thereby.

2. The ink jet printer of claim 1 in which said stimulator means stimulates said orifice plate means at a point substantially on said center line and adjacent a first end of said orifice plate means.

3. The ink jet printer of claim 2 in which said orifice line is substantially straight and converges with said center line from a point adjacent said first end of said orifice plate means, which point is substantially laterally displaced from said center line.

4. The ink jet printer of claim 3 in which the included angle $\theta$ between said center line and said orifice line is defined by the equation $$\theta = \tan^{-1}\left[\frac{W\cos^{-1}(e^{-\alpha b})}{\pi b}\right]$$

where $\alpha$=total attenuation coefficient of said orifice plate means,

W=width of the orifice plate means, and b=distance along said center line from the point of stimulation to the intersection of said orifice line and said center line.

5. The ink jet printer of claim 2 in which said orifice line is a curved line.

6. The ink jet printer of claim 5 in which said orifice line is a curved line defined by the equation $$\cos\beta(y)=e^{\alpha(x-b)}$$

where $\alpha$=total attenuation coefficient of said orifice plate means, x=distance in a direction parallel to said center line from the point of stimulation, y=distance from said center line in a direction perpendicular to said center line, $$\beta(y)=y\pi/W,$$

W=width of the orifice plate means, and b=distance to the point of intersection of said center line and said orifice line from said point of stimulation.

7. Apparatus for generating a plurality of fluid jet drop streams, comprising:

fluid reservoir means defining an elongated fluid receiving reservoir, orifice plate means extending the length of said fluid receiving reservoir and communicating therewith, said orifice plate means defining a plurality of orifices from which filaments of said print fluid emerge, said orifices being positioned along an orifice line on said orifice plate means which is non-parallel with respect to the center line of said orifice plate means and all of said orifices along said orifice line being positioned to one side of said center line for decreased point-to-point variation in stimulation amplitude, said center line extending in the direction of elongation of said fluid receiving reservoir, and stimulator means for inducing bending waves in said orifice plate means which travel along said orifice plate means in a direction parallel to said center line, said waves imparting mechanical stimulation to each of said fluid filaments to cause break up of said filaments into drop streams.

8. The apparatus of claim 1 in which said stimulator means stimulates said orifice plate means at a point substantially on said center line and adjacent a first end of said orifice plate means.

9. The apparatus of claim 8 in which said orifice line is substantially straight and converges with said center line from a point adjacent said first end of said orifice plate means, which point is substantially laterally displaced from said center line.

10. The apparatus of claim 9 in which the included angl $\theta$ between said center line and said orifice line is defined by the equation $$\theta = \tan^{-1}\left[\frac{W\cos^{-1}(e^{-\alpha b})}{\pi b}\right]$$

where $\alpha$=total attenuation coefficient of said orifice plate means,

W=width of the orifice plate means, and b=distance along said center line from the point of stimulation to the intersecton of said orifice line and said center line.

11. The apparatus of claim 8 in which said orifice line is a curved line.

12. The apparatus of claim 11 in which said orifice line is a curved line defined by the equation $$\cos\beta(y)=e^{\alpha(x-b)}$$

where $\alpha$=total attenuation coefficient of said orifice plate means, x=distance in a direction parallel to said center line from the point of stimulation, =distance from said center line in a direction perpendicular to said center line, $$\beta(y)=y\pi/W,$$

W=width of the orifice plate means, and b=distance to the point of intersection of said center line and said orifice line from said point of stimulation.

13. Apparatus for generating a plurality of fluid jet drop streams, comprising:

fluid reservoir means defining an elongated fluid receiving reservoir, orifice plate means extending the length of said fluid receiving reservoir and communicating therewith, said orifice plate means defining a plurality of orifices from which filaments of said print fluid emerge, said orifices being positioned along said orifice plate means for decreased point-to-point variation in stimulation amplitude, each of said orifices being closer to the center line of said orifice plate means than the orifices nearer a first end of said orifice plate, said center line extending in the direction of elongation of said fluid receiving reservoir, and stimulator means for stimulating said orifice plate means at a point substantially on said center line and adjacent said first end of said orifice plate means to induce bending waves in said orifice plate means which travel along said orifice plate means in a direction parallel to said center line, said waves imparting mechanical stimulation to each of said fluid filaments to cause break up of said filaments into drop streams.

14. The apparatus of claim 13 in which said orifices are positioned along an orifice line which is substantially straight and which converges with said center line from an initial point adjacent said first end of said orifice plate means, said initial point being substantially laterally displaced from said center line.

15. The apparatus of claim 13 in which said orifices are positioned along an orifice line which is curved.

* * * * *

UNITED STATES PATENT AND TRADEMARK OFFICE
CERTIFICATE OF CORRECTION

PATENT NO. : 4,229,748

DATED : October 21, 1980

INVENTOR(S) : Ted F. Williams and Charles L. Cha

It is certified that error appears in the above-identified patent and that said Letters Patent are hereby corrected as shown below:

Column 2, line 19, "be" should be --by--.
Column 9, line 32, "y" should precede "= distance from said center line in a direction perpendicular to said center line".

Signed and Sealed this

*Thirteenth* Day of *January 1981*

[SEAL]

*Attest:*

SIDNEY A. DIAMOND

*Attesting Officer* *Commissioner of Patents and Trademarks*